C. A. MARIEN.
CUSHION TIRE WHEEL.
APPLICATION FILED FEB. 2, 1910.
979,870.
Patented Dec. 27, 1910.
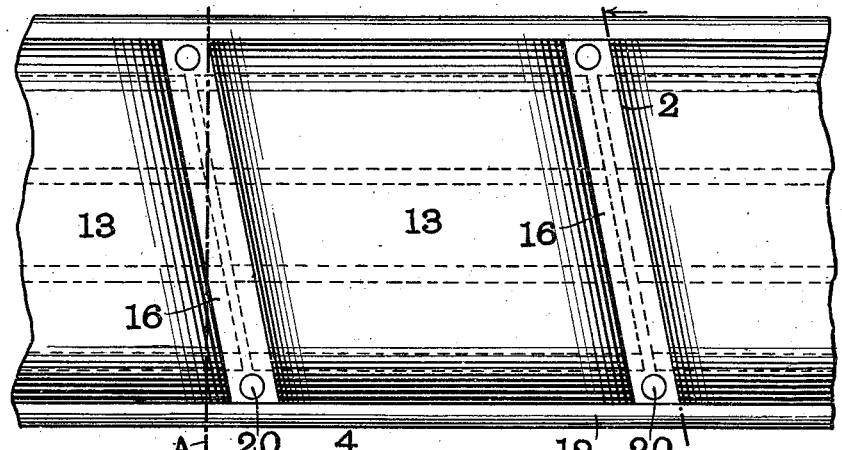
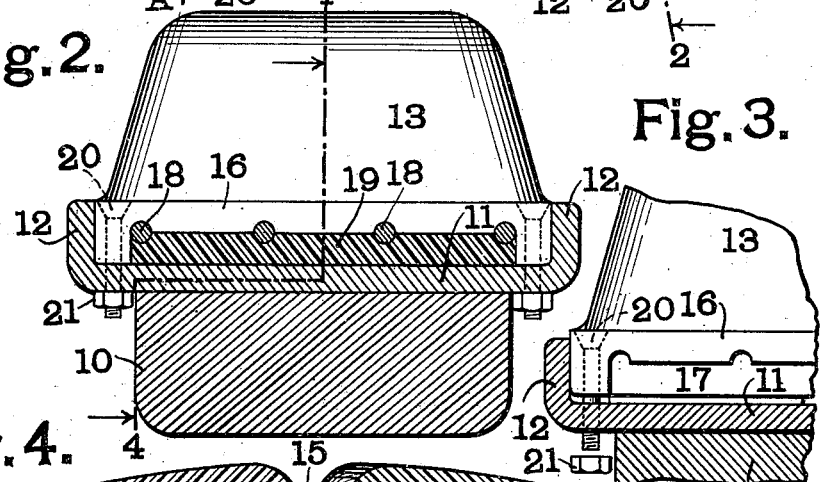
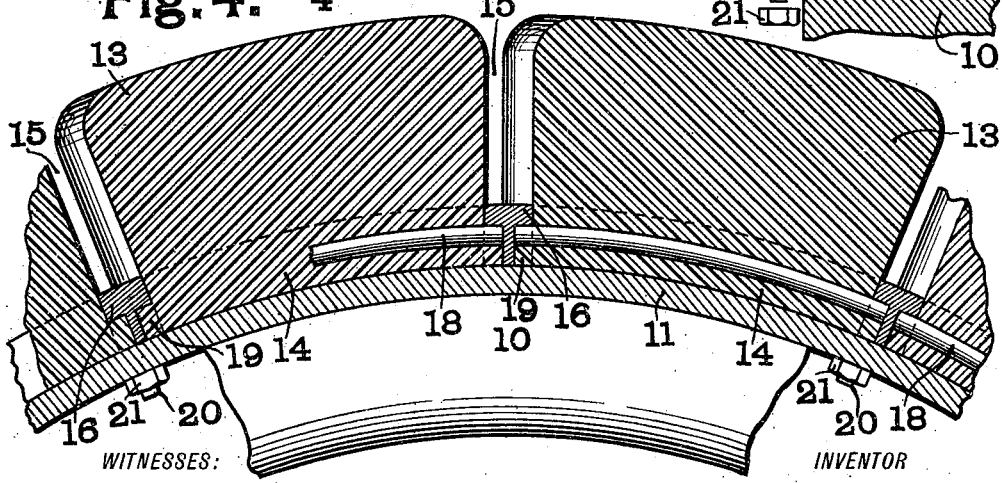
WITNESSES:
L. L. Mead.
W. A. Alexander.
INVENTOR
Charles A. Marien,
BY
Fowler & Huffman
ATTORNEYS

UNITED STATES PATENT OFFICE.

CHARLES A. MARIEN, OF ST. LOUIS, MISSOURI.

CUSHION-TIRE WHEEL.

979,870. Specification of Letters Patent. Patented Dec. 27, 1910.

Application filed February 2, 1910. Serial No. 541,442.

*To all whom it may concern:*

Be it known that I, CHARLES A. MARIEN, a citizen of the United States, residing at St. Louis, Missouri, have invented a certain new and useful Cushion-Tire Wheel, of which the following is such a full, clear, and exact description as will enable any one skilled in the art to which it appertains to make and use the same, reference being had to the accompanying drawings, forming part of this specification.

My invention relates to a cushion tire wheel and particularly to a cushion tire wheel in which the tire is composed of a number of sections which may be separately secured to and removed from the wheel.

One object of my invention is to so construct the tire that it will obviate the jar which takes place in the ordinary sectional tire when the point of contact between the tire and ground passes from one section to another.

Another object of my invention is to provide improved means for securing the sections to the periphery of the wheel.

In the accompanying drawings which illustrate one form of wheel made in accordance with my invention Figure 1 is a top plan view of a portion of the wheel; Fig. 2 is a section on the line 2—2 of Fig. 1; Fig. 3 is a view showing a detail of construction and Fig. 4 is a section on the line 4—4 of Fig. 2.

Like marks of reference refer to similar parts in the several views of the drawings.

10 represents the felly of the wheel which is preferably made of wood and which may be of any usual form. Surrounding the felly 10 is a rim 11 preferably having its sides 12 turned over as best shown in Fig. 2, so as to form a channel for the reception of the tire proper. The sides of the rim 11 project beyond the felly 10 as shown in Figs. 2 and 3. Situated in the channel formed by the rim 11 is the tire which consists of a number of sections formed of rubber or other resilient material. These sections each consists of a body 13 and a base 14. The base 14 is of such width as to fit snugly within the rim 11. The bodies 13 are somewhat shorter than the bases so as to leave spaces 15 between the adjacent ends of the bodies to allow for the flow of the material of the tire when the tire is compressed. The ends of the sections are inclined, as best shown in Fig. 1 so that as the tire passes over the ground one section will come into contact with the ground before the other has passed out of contact therewith.

In Fig. 1 A represents the line at right angles to the plane of the wheel and will coincide with the line of contact of the wheel with the ground. It will be evident from this view that one section of the wheel will come into contact with the ground before the other has passed out of contact therewith. Placed between the ends of each pair of sections is a cross-bar 16. Each of these bars 16 is provided with a pair of pockets 17 one at each side of the bar. These pockets 17 are adapted to receive the ends of rods 18 passing longitudinally through the sections and also to receive projections 19 formed of the ends of the bases 14 of the sections. These pockets 17 are made of slightly less depth than the projections 19 as is shown in Fig. 3 so that the said projections will be compressed when the bars are drawn down into position. The bars are held in position by means of bolts 20 passing through the cross bar 16 and the extending portion of the rim 11 and engaging with nuts 21.

By the use of my form of tire the jolting usually caused by sectional tires is obviated without resorting to the twin or double type of tire, at the same time the construction is extremely simple and the sections while readily removable separately are very rigidly held so that the liability of tearing the reinforcing rods loose from the resilient material of the tire is overcome.

Having fully described my invention what I claim as new and desire to secure by Letters Patent of the United States is:

The combination with a wheel, of a channel-shaped rim on said wheel, a tire of resilient material formed in sections, the ends of said sections being inclined to the plane of the wheel, the base of each of said sections being provided with longitudinal projections, longitudinal rods embedded in the base of said sections, inclined cross bars each provided on each side with a pocket to receive the projections of said base and the ends of said rods, and means for removably securing said cross bars in said channel-shaped rim.

In testimony whereof, I have hereunto set my hand and affixed my seal in the presence of the two subscribing witnesses.

CHAS. A. MARIEN. [L. S.]

Witnesses:
W. A. ALEXANDER,
ELIZABETH BAILEY.